United States Patent Office 3,493,585
Patented Feb. 3, 1970

3,493,585
4-GUANYL-2,3,4,5-TETRAHYDRO-1,4-BENZOXAZEPINES
Karl Schenker, Binningen, Switzerland, assignor to Ciba Corporation, Summit N.J., a corporation of Delaware
No Drawing. Continuation-in-part of application Ser. No. 514,110, Dec. 15, 1965. This application June 23, 1969, Ser. No. 835,719
Claims priority, application Switzerland, Jan. 19, 1965, 741/65
Int. Cl. C07d 87/54
U.S. Cl. 260—333    5 Claims

ABSTRACT OF THE DISCLOSURE

Compounds of the formula

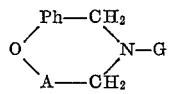

in which Ph is an optionally substituted ortho-phenylene radical, A an alkylidene radical and G an optionally substituted guanyl group and their salts are useful as antihypertensive agents.

CROSS-REFERENCE TO OTHER APPLICATIONS

This is a continuation-in-part of my copending application Ser. No. 514,110, filed Dec. 15, 1965, and now abandoned.

SUMMARY OF THE DISCLOSURE

The present invention relates to new oxazepines. Especially it concerns 4-guanyl-2,3,4,5-tetrahydro-1,4-benzoxazepines of the formula

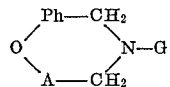

wherein Ph represents an ortho-phenylene radical, A an alkylidene radical and G a guanyl group, and their salts.

The ortho-phenylene radical Ph may be unsubstituted or substituted. Suitable substituents are, for example, lower alkyl radicals, lower alkoxy groups, halogen atoms and/or trifluoromethyl groups.

The alkylidene radical A is above all a lower alkylidene radical, e.g. a radical of the formula

where $R_o$ is a lower alkyl radical or, preferably, a hydrogen atom.

The nitrogen atoms of the guanyl group G may be substituted, but preferably they are unsubstituted. Substituents of these nitrogen atoms are primarily lower alkyl radicals or lower alkylene radicals. The latter may also connect different nitrogen atoms.

Lower alkyl radicals are especially methyl, ethyl, propyl or isopropyl groups; or linear or branched butyl, pentyl or hexyl groups which may be bound in any desired position.

Lower alkoxy groups are more especially methoxy, ethoxy, propoxy, butoxy or pentyloxy groups.

Particularly suitable halogen atoms are bromine, chlorine or fluorine atoms.

Lower alkylene radicals are, for example, ethylene, propylene or butylene radicals.

The new guanyl-tetrahydro-benzoxazepines possess valuable pharmacological properties, especially an antihypertensive action and are useful as hypotensive agents. They may also be used as intermediates, for example for the manufacture of pharmacologically active compounds.

Particularly valuable are the compounds of the formula

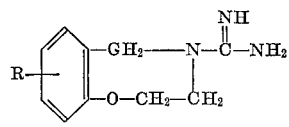

in which R represents a lower alkyl radical, a lower alkoxy radical, the trifluoromethyl group or especially a hydrogen atom or a halogen atom, such as a chlorine atom, and more especially 4-guanyl-2,3,4,5-tetrahydro-1,4-benzoxazepine.

The new compounds are manufactured by known methods.

According to a preferred variant a 2,3,4,5-tetrahydro-1,4-benzoxazepine of the formula

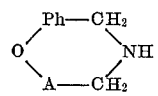

in which Ph and A have the above meanings or a salt thereof is reacted with a compound of the formula

in which Z represents an amino group, such as a free or alkylated amino group; Y stands for an etherified mercapto group, e.g. a lower alkylmercapto or benzylmercapto group; X stands for a hydrogen atom or a substituent, e.g. an alkyl radical, or X and Y together with the CN double bond form a triple bond, or with a salt thereof.

Substitutable guanyl groups in a resulting compound can be substituted, e.g. alkylated. The substitution is carried out in the usual manner, e.g. by reaction with a reactive ester of a suitable alcohol. Reactive esters are above all esters with strong organic or inorganic acids, e.g. with hydrohalic acids, e.g. hydrochloric, hydrobromic or hydriodic acid, with sulfuric acid or organic sulfonic acids such as para-toluenesulfonic, para-bromobenzenesulfonic or benzenesulfonic acid.

Depending on the reaction conditions and starting materials used the final products are obtained in the free form or in the form of their salts which are likewise included in the present invention. The salts of the final products can be converted into the free bases in known manner, e.g. with alkalies or ion exchange resins. When the free bases are reacted with organic or inorganic acids, especially those which are capable of forming therapeutically acceptable salts, they furnish salts. As such acids there may be mentioned, for example hydrohalic, sulfuric and phosphoric acids, nitric and perchloric acid; aliphatic, alicyclic, aromatic or heterocyclic carboxylic or sulfonic acids, such as formic, acetic, propionic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicylic or para-aminosalicylic acid; embonic, methanesulfonic, ethanesulfonic, hydroxyethanesulfonic, ethylenesulfonic acid; halobenzenesulfonic, toluenesulfonic, naphthalenesulfonic or sulfanilic acid; methionine, tryptophan, lysine or arginine.

These or other salts of the new compounds, for example their picrates, may also be used for purifying the resulting free bases, by converting the free bases into salts, isolating them and liberating the bases again from the salts. In view of the close relationship between the new compounds in the free form and in the form of their salts what has been said above and hereinafter with reference to the free bases refers equally to the corresponding salts wherever this is possible and useful.

The invention further includes any variant of the process in which an intermediate obtainable at any stage thereof is used as starting material and any remaining step/steps is/are carried out, or in which the starting materials are formed under the reaction conditions or are used in the form of their salts.

The reactions of this invention are preferably carried out with starting materials that give rise to the preferred compounds referred to above.

The starting materials are known or, if new, they can be manufactured by known methods.

Racemic starting or final products can be resolved into their optical antipodes, likewise by known methods, for example as follows: The racemic bases are dissolved in a suitable inert solvent, reacted with a optically active acid and the resulting salts are separated, e.g. on the strength of their different solubilities, into the diastereomers from from which the antipodes of the new bases can be liberated by treatment wtih alkaline agents. Particularly frequently used optically active acids are the D- and L-forms of tartaric, di-ortho-toluoyltartaric, malic, mandelic, camphorsulfonic and quinic acid. Alternatively, the separation may also be achieved, for example, by recrystallizing the resulting racemate from an optically active solvent. It is of advantage to isolate the more active of the two antipodes.

The new compounds may be used, for example, in the form of pharmaceutical preparations containing them in the free form or in the form of their salts in conjunction or admixture with an organic or inorganic, solid or liquid pharmaceutical excipient suitable for enteral or parenteral administration. Suitable excipients are substances that do not react with the new compounds, for example water, gelatin, lactose, starches, stearyl alcohol, magnesium stearate, talcum, vegetable oils, benzyl alcohols, gums, propyleneglycols, white petroleum jelly or other known medicinal excipients. The pharmaceutical preparations may be, for example, tablets, dragees or capsules, or in liquid form solutions, suspensions or emulsions. They may be sterilized and/or contain assistants such as preserving, stabilizing, wetting or emulsifying agents, solution promoters, salts for regulating the osmotic pressure or buffers. They may also contain further therapeutically useful substances. The pharmaceutical preparations are formulated by conventional methods. The dosage of the new compounds may vary according to the degree of hypertension to be treated. Usually it is within the range of 25 to 100 mg., e.g. between 40 and 60 mg.

The new compounds may also be used in the form of feeding stuffs or of additives to feeding stuffs, using, for example, the usual extenders and diluents and feeding stuffs respectively.

The following examples illustrate the invention.

EXAMPLE 1

A solution of 10.0 g. (0.067 mol) of 2,3,4,5-tetrahydro-1,4-benzoxazepine, 5.7 g. (0.060 mol) of methanesulfonic acid and 5.5 g. (0.134 mol) of cyanamide in 150 ml. of ethanol is refluxed for 24 hours. Another 5.5 g. of cyanamide are then added and the batch is refluxed on for 24 hours, and kept for several hours at 0° C., whereupon 1.5 g. of dicyandiamide can be filtered off. The filtrate is mixed with 50 ml. of ether and 1 g. of active carbon, again filtered and concentrated under a water-jet vacuum to a viscous oil which is digested with 80 ml. of methylenechloride, whereupon another 4.0 g. of crystalline dicyandiamide settle out. The batch is filtered, 1.0 g. of methanesulfonic acid is added and the whole is evaporated to dryness under a water-jet vacuum. The residual glassy material is dissolved in 200 ml. of water and rendered alkaline with 20 ml. of concentrated aqueous ammonia. Three extractions with methylenechloride furnish a thinly liquid oil which is discarded.

The aqueous phase is mixed with 15 g. of solid sodium hydroxide and 100 ml. of saturated sodium chloride solution and extracted by being vigorously agitated eight times with chloroform. The combined chloroform extracts are washed with 50 ml. of saturated sodium chloride-solution and then dried over anhydrous sodium sulfate. Evaporation yields 4-guanyl-2,3,4,5-tetrahydro-1,4-benzoxazepine of the formula

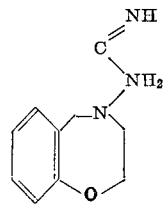

as an almost colorless, viscous oil.

The hydrochloride can be prepared thus: A solution of 11.5 g. of crude 4-guanyl-2,3,4,5-tetrahydro-1,4-benzoxazepine in a mixture of 50 ml. of acetone and 20 ml. of ethanol is neutralized with 2 N-solution of hydrogen chloride in ethyl acetate, whereupon the hydrochloride begins immediately to settle out. The batch is left to itself for 2 hours at 0° C. When the precipitate is suctioned-filtered, it yields 4-guanyl-2,3,4,5-tetrahydro-1,4-benzoxazepine hydrochloride in the form of pale-yellow crystals melting at 227 to 229° C. On recrystallization from methanol+ethyl acetate the pure hydrochloride melting at 229° C. is obtained.

The 2,3,4,5-tetrahydro-1,4-benzoxazepine used as starting material can be prepared in the following manner:

A solution of 40 g. (0.226 mol) of 3,5-dioxo-2,3,4,5-tetrahydro-1,4-benzoxazepine in 300 ml. of tetrahydrofuran is stirred slowly into a boiling suspension of 15 g. (0.38 mol) of lithium-aluminum hydride in 200 ml. of anhydrous tetrahydrofuran, and the reaction mixture is then refluxed for 10 hours. While cooling the batch with ice, there are successively dropped in 15 ml. of water, 15 ml. of aqueous 15% sodium hydroxide solution and another 45 ml. of water. The undissolved matter is suctioned off and thoroughly rinsed with chloroform. The filtrate is evaporated in a water-jet vacuum and the residue dissolved in 400 ml. of N-hydrochloric acid. The aqueous solution is treated with active carbon, filtered and rendered alkaline with sodium hydroxide solution. The batch is extracted with chloroform, evaporated and the residue distilled through a Vigreux-Hickmann column, to yield 2,3,4,5-tetrahydro-1,4-benzoxazepine as a colorless oil which boils at 122 to 129° C. under a pressure of 15 mm. Hg.

EXAMPLE 2

In an analogous manner to that described in Example 1 there is obtained from 12.0 g. of 8-methoxy-2,3,4,5-tetrahydro-1,4-benzoxazepine, 5.7 g. of methanesulfonic acid and twice 5.5 g. of cyanamide, 4-guanyl-8-methoxy-2,3,4,5-tetrahydro-1,4-benzoxazepine and its hydrochloride.

The 8-methoxy-2,3,4,5-tetrahydro - 1,4 - benzoxazepine used as starting material can be prepared by reduction of 8 - methoxy - 3,4 - dihydro - 1,4 - benzoxazepin - 5 - (2H)-one with lithium aluminum hydride.

EXAMPLE 3

In an analogous manner to that described in Example 1 there is obtained from 10.9 g. of 9-methyl-2,3,4,5-tetrahydro-1,4-benzoxazepine, 5.7 g. of methanesulfonic acid and twice 5.5 g. of cyanamide, 4-guanyl-9-methyl-2,3,4,5-tetrahydro-1,4-benzoxazepine and its hydrochloride.

The 9 - methyl - 2,3,4,5 - tetrahydro - 1,4 - benzoxazepine used as starting material can be prepared by reduction of 9-methyl-3,4-dihydro-1,4-benzoxazepin-5(2H)-one with lithium aluminum hydride.

EXAMPLE 4

In an analogous manner to that described in Example 1 there is obtained from 12.3 g. of 9-chloro-2,3,4,5-tetrahydro-1,4-benzoxazepine, 5.7 g. of methanesulfonic acid and twice 5.5 g. of cyanamide, 4-guanyl-9-chloro-2,3,4,5-tetrahydro-1,4-benzoxazepine and its hydrochloride.

The starting material may be prepared in an analogous manner to that described in the foregoing examples.

EXAMPLE 5

In an analogous manner to that described in Example 1 there is obtained from 15.3 g. of 7-bromo-2,3,4,5-tetrahydro-1,4-benzoxazepine, 5.7 g. of methanesulfonic acid and twice 5.5 g. of cyanamide, 4-guanyl-7-bromo-2,3,4,5-tetrahydro-1,4-benzoxazepine and its hydrochloride.

The starting material may be prepared in an analogous manner to that described in the foregoing examples.

EXAMPLE 6

In an analogous manner to that described in Example 1 thereis obtained from 13.3 g. of 2-methyl-7-chloro-2,3,4,5-tetrahydro-1,4-benzoxazepine, 5.7 g. of methanesulfonic acid and twice 5.5 g. of cyanamide, 2-methyl-4-guanyl-7-chloro-2,3,4,5-tetrahydro-1,4-benzoxazepine and its hydrochloride.

The starting material may be prepared in an analogous manner to that described in the foregoing examples.

EXAMPLE 7

In an analogous manner to that described in Example 1 there is obtained from 14.5 g. of 6-trifluoromethyl-2,3,4,5-tetrahydro-1,4-benzoxazepine, 5.7 g. of methanesulfonic acid and twice 5.5 g. of cyanamide, 4-guanyl-6-trifluoromethyl-2,3,4,5-tetrahydro-1,4-benzoxazepine and its hydrochloride.

The starting material may be prepared in an analogous manner to that described in the foregoing examples.

EXAMPLE 8

In an analogous manner to that described in the foregoing examples there can be prepared from 2,3,4,5-tetrahydro-1,4-benzoxazepine, methanesulfonic acid and methylcyanamide 4(N-methylguanyl)-2,3,4,5 - tetrahydro - 1,4-benzoxazepine and its hydrochloride.

EXAMPLE 9

In an analogous manner to that described in the foregoing examples there can be prepared from 9-chloro-7-methyl-2,3,4,5-tetrahydro-1,4-benzoxazepine, methanesulfonic acid and cyanamide 4-guanyl-7-methyl-9-chloro-2,3,4,5-tetrahydro-1,4-benzoxazepine and its hydrochloride.

EXAMPLE 10

Tablets each containing 50 mg. of 4-guanyl-2,3,4,5-tetrahydro-1,4-benzoxazepine hydrochloride can be prepared, for example, from the following ingredients:

| | Per tablet, mg. |
|---|---|
| 4 - guanyl - 2,3,4,5 - tetrahydro - 1,4 - benzoxazepine hydrochloride | 50 |
| Wheat starch | 40 |
| Lactose | 70 |
| Colloidal silicic acid | 10 |
| Arrowroot | 19 |
| Talc | 10 |
| Magnesium stearate | 1 |
| | 200 |

PREPARATION

4 - guanyl - 2,3,4,5 - tetrahydro - 1,4 - benzoxazepine hydrochloride is mixed with part of the wheat starch and with lactose and colloidal silicic acid, and the mixture forced through a sieve. The remaining wheat starch is pasted on a water bath with the five-fold quantity of water, and the resulting paste kneaded with the powder mixture until a slightly plastic mass is obtained.

The plastic mass is passed through a sieve having a mesh width of 3 mm., dried, and the dry granulate also forced through a sieve. Arrowroot, talc and magnesium stearate are admixed, and the mixture compressed into tablets each weighing 200 mg.

What is claimed is:

1. A member selected from the group consisting of compounds of the formula

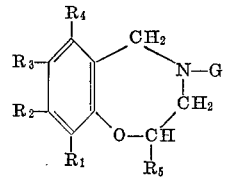

in which $R_1$, $R_2$, $R_3$ and $R_4$ each stands for a member selected from the group consisting of hydrogen, lower alkyl, lower alkoxy, halogen and trifluoromethyl, $R_5$ for a member selected from the group consisting of hydrogen and lower alkyl and G for

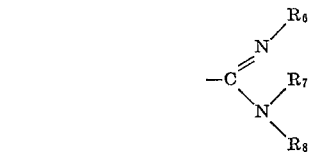

$R_6$, $R_7$ and $R_8$ each standing for a member selected from the group consisting of hydrogen and lower alkyl, and their pharmaceutically acceptable acid addition salts.

2. A compound as claimed in claim 1, wherein $R_1$, $R_2$, $R_3$ and $R_4$ and $R_5$ have the meanings given and G stands for guanyl.

3. A compound as claimed in claim 1, wherein one of the radicals $R_1$, $R_2$, $R_3$ and $R_4$ stands for a member selected from the group consisting of hydrogen, lower alkyl, lower alkoxy, halogen and trifluoromethyl and the others for hydrogen, $R_5$ stands for hydrogen and G for guanyl.

4. A compound as claimed in claim 1, wherein one of the radicals $R_1$, $R_2$, $R_3$ and $R_4$ stands for a member selected from the group consisting of hydrogen and halogen and the others for hydrogen, $R_5$ stands for hydrogen and G for guanyl.

5. A compound as claimed in claim 1, wherein $R_1$, $R_2$, $R_3$, $R_4$ and $R_5$ stand for hydrogen and G for guanyl.

References Cited

UNITED STATES PATENTS 2,807,628   9/1957   Belleau _____ 260—333

OTHER REFERENCES

Marson, Chemical Abstracts, vol. 54 (1960), pp. 567–568.

NORMA S. MILESTONE, Primary Examiner

U.S. Cl. X.R.

260—256.4, 309.6, 326.5; 424—244